(12) United States Patent
Tytgat et al.

(10) Patent No.: US 9,269,194 B2
(45) Date of Patent: Feb. 23, 2016

(54) METHOD AND ARRANGEMENT FOR 3-DIMENSIONAL IMAGE MODEL ADAPTATION

(75) Inventors: Donny Tytgat, Antwerp (BE); Sammy Lievens, Antwerp (BE); Maarten Aerts, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 87 days.

(21) Appl. No.: 14/122,165

(22) PCT Filed: Jun. 4, 2012

(86) PCT No.: PCT/EP2012/060512
§ 371 (c)(1),
(2), (4) Date: Mar. 10, 2014

(87) PCT Pub. No.: WO2012/175321
PCT Pub. Date: Dec. 27, 2012

(65) Prior Publication Data
US 2014/0212031 A1    Jul. 31, 2014

(30) Foreign Application Priority Data

Jun. 20, 2011  (EP) .................................. 11305768
Sep. 12, 2011  (EP) .................................. 11306127

(51) Int. Cl.
*G06K 9/00*    (2006.01)
*G06T 19/20*   (2011.01)
*G06T 7/20*    (2006.01)

(52) U.S. Cl.
CPC ............... *G06T 19/20* (2013.01); *G06T 7/2046* (2013.01); *G06T 2207/10016* (2013.01); *G06T 2207/20121* (2013.01); *G06T 2207/30201* (2013.01)

(58) Field of Classification Search
CPC ............................. G06T 19/20; G06T 7/2046
USPC .......................................................... 382/154
See application file for complete search history.

(56) References Cited

U.S. PATENT DOCUMENTS 6,072,903 A *  6/2000  Maki et al. ..................... 382/190
6,862,374 B1 *  3/2005  Nagai et al. .................... 382/285
(Continued)

FOREIGN PATENT DOCUMENTS

CN         101479765    7/2009
EP         1669933      6/2006
(Continued)

*Primary Examiner* — Samir Ahmed
(74) *Attorney, Agent, or Firm* — Patti & Malvone Law Group, LLC

(57) ABSTRACT

Method for adapting a 3D model (m) of an object, said method comprising the steps of
performing at least one projection of said 3D model to obtain at least one 2D image model projection (p1) with associated depth information (d1),
performing at least one state extraction operation on said at least one 2D image model projection (p1), thereby obtaining at least one state (s1)
adapting said at least one 2D image model projection (p1) and said associated depth information (d1) in accordance with said at least one state (s1) and with a target state (s), thereby obtaining at least one adapted 2D image model (p1') and an associated adapted depth (d1')
back-projecting said at least one adapted 2D image model (p1') to 3D, based on said associated adapted depth (d1') for thereby obtaining an adapted 3D model (m').

14 Claims, 11 Drawing Sheets

(56) References Cited

U.S. PATENT DOCUMENTS

| | | | | |
|---|---|---|---|---|
| 8,035,639 | B2* | 10/2011 | Witte | 345/419 |
| 2001/0037191 | A1* | 11/2001 | Furuta et al. | 703/6 |
| 2004/0055794 | A1* | 3/2004 | Akatsuka et al. | 178/18.01 |
| 2010/0215255 | A1 | 8/2010 | Xiao et al. | |
| 2010/0284607 | A1* | 11/2010 | Van Den Hengel et al. | 382/154 |
| 2013/0307827 | A1* | 11/2013 | Reisman et al. | 345/175 |

FOREIGN PATENT DOCUMENTS

| | | |
|---|---|---|
| JP | 2002015310 | 1/2002 |
| JP | 2006163871 | 6/2006 |
| JP | 2010072700 | 4/2010 |
| TW | 200910263 | 3/2009 |
| TW | M403161 | 5/2011 |
| WO | WO 2010/112320 | * 10/2010 |

* cited by examiner

METHOD AND ARRANGEMENT FOR 3-DIMENSIONAL IMAGE MODEL ADAPTATION

TECHNICAL FIELD

The present invention claims priority on the earlier filed European Patent Application 11305768 and relates to a method for adaptation of a three-dimensional, which, during the remainder of the text will be abbreviated by 3D, image model.

BACKGROUND 3D model adaptation is usually done in a manual way, which is generally not desirable. Another way to adapt a 3D model makes use of state adaptation, which concerns the adaptation of the 3D model in order to comply with a certain state. The state affects the 3D position of the shape and/or the appearance such as the texture of certain parts or features of the model. Again a major problem with present techniques for 3D model state adaptation is that the number of features to be adapted in 3D is usually very high, such that again manual intervention is often required due to insufficient computing resources. Moreover state-of-the-art techniques are limited to using rigged models, which presents a severe limitation for use in dynamic systems where models can be learned such that their shape can also vary during the learning process.

SUMMARY

It is therefore an object of embodiments of the present invention to present a method and an arrangement for 3D image model adaptation, which can be used fully automatically and enables using dynamically adaptable models.

According to embodiments of the present invention this object is achieved by a method for adapting a 3D model of an object, said method comprising the steps of
  performing at least one projection of said 3D model to obtain at least one 2D image model projection (p1) with associated depth information (d1),
  performing at least one state extraction operation on said at least one 2D image model projection (p1), thereby obtaining at least one state (s1)
  adapting said at least one 2D image model projection (p1) and said associated depth information in accordance with said at least one slate (s1) and with a target state (s), thereby obtaining at least one adapted 2D image model (p1') and an associated adapted depth (d1')
  back-projecting said at least one adapted 2D image model to 3D, based on said associated adapted depth (d1') for thereby obtaining an adapted 3D model (m').

By adapting the state of at least one 2D projection and its associated depth information of a 3D image model, less computing resources are used, therefore obviating the need for manual intervention in the process. The back-projection to 3D ensures that the 3D model itself is adapted as realistically as possible.

In an embodiment the adapted 3D model (m') is further determined based on the initial 3D model (m) information.

This enable a smooth morphing of the adapted model.

In another embodiment the target state (s) is determined by externally imposed restrictions.

This may e.g. comprise high level information with respect to the form of a nose, color of the eyes, etc.

In another embodiment the target state (s) is obtained from the state (se) of an external image input (IV).

This allows a 3D model to smoothly adapt to the changing features of e.g. an object on a live video, or to resemble this object as present on a still image, as the target state will be obtained by combining the state (se) of said external image input (IV) with said at least one state (s1).

In a preferred variant said external image input (IV) comprises a 2D image input and one of the at least one 2D projections of said 3D model is performed in accordance with a virtual camera deduced from said external image input (IV).

This is useful for obtaining an optimum relationship between the external image input and the 3D model.

In yet another variant the external image input may comprise a 2D+disparity input, with which is meant that both 2D as well as disparity information is externally provided e.g. by a stereoscopic camera. Depth information can then be directly derived from this disparity information by means of the formula depth×disparity=constant.

This allows to directly use the depth data from this input, for updating the associated depth.

The present invention relates as well to embodiments of an arrangement for performing this method, for image or video processing devices incorporating such an arrangement and to a computer program product comprising software adapted to perform the aforementioned or claimed method steps, when executed on a data-processing apparatus.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

During the whole of the text two-dimensional will be abbreviated by 2D, while, as previously mentioned, three-dimensional will be abbreviated by 3D.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION

If should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Figure 1A:
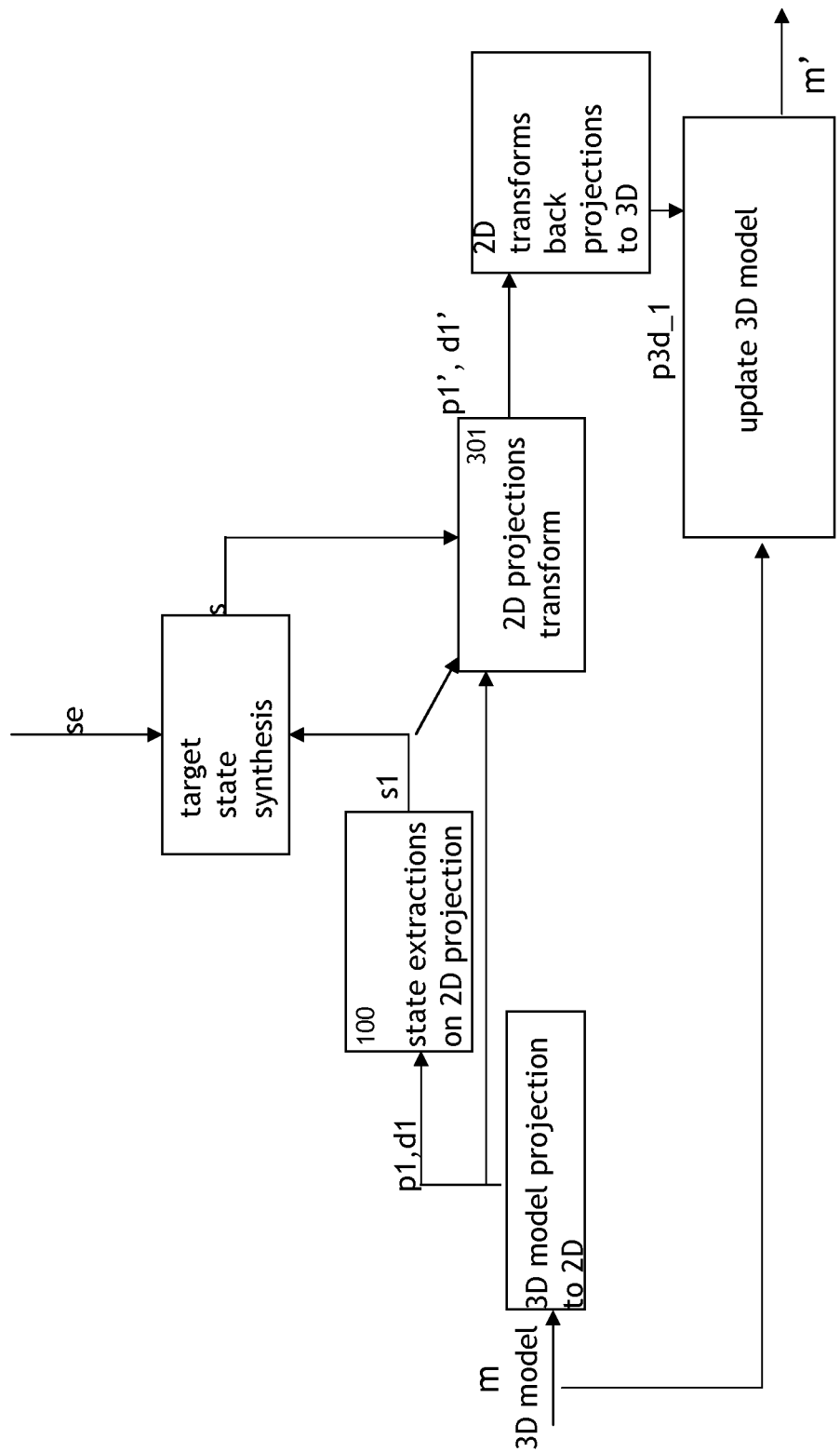
FIGS. 1a-b show a first variant of the method and apparatus.

FIG. 1a shows the steps as performed by a first variant of the method for adapting a 3D model, denoted m.

In a first step a projection of the 3D model is performed to 2D. The parameters for this projection, are the one used according to the well-known pinhole camera model as is for instance described in chapter 6 of the tutorial handbook "Multiple View Geometry in computer vision" by Richard Hartley and Andrew Zisserman, Cambridge University Press, second edition 2003, ISBN 0521 54051 8.

This thus concerns the projection of points in a 3D space onto a plane, via a central "pinhole". In this model the plane corresponds to the projection plane of the camera, with the pinhole corresponding to the diafragma opening of the camera, often also denoted as the camera center. The result of the projection step is denoted p1, d1, with p1 indicating the 2D projection itself, which can be represented by a 2D matrix of pixel values containing color information, and with d1 indicating the projection depth map, which may also be represented by a 2D matrix of the associated depth values. These associated depth values are calculated from the original depth values and the camera position according to well known equations which will also be given in a later paragraph.

Alternatively the projection and the depth map can be represented within one large 2D matrix, wherein, for each projected pixel, both color information and associated depth information, is present in the corresponding matrix row and column.

Figure 2A:
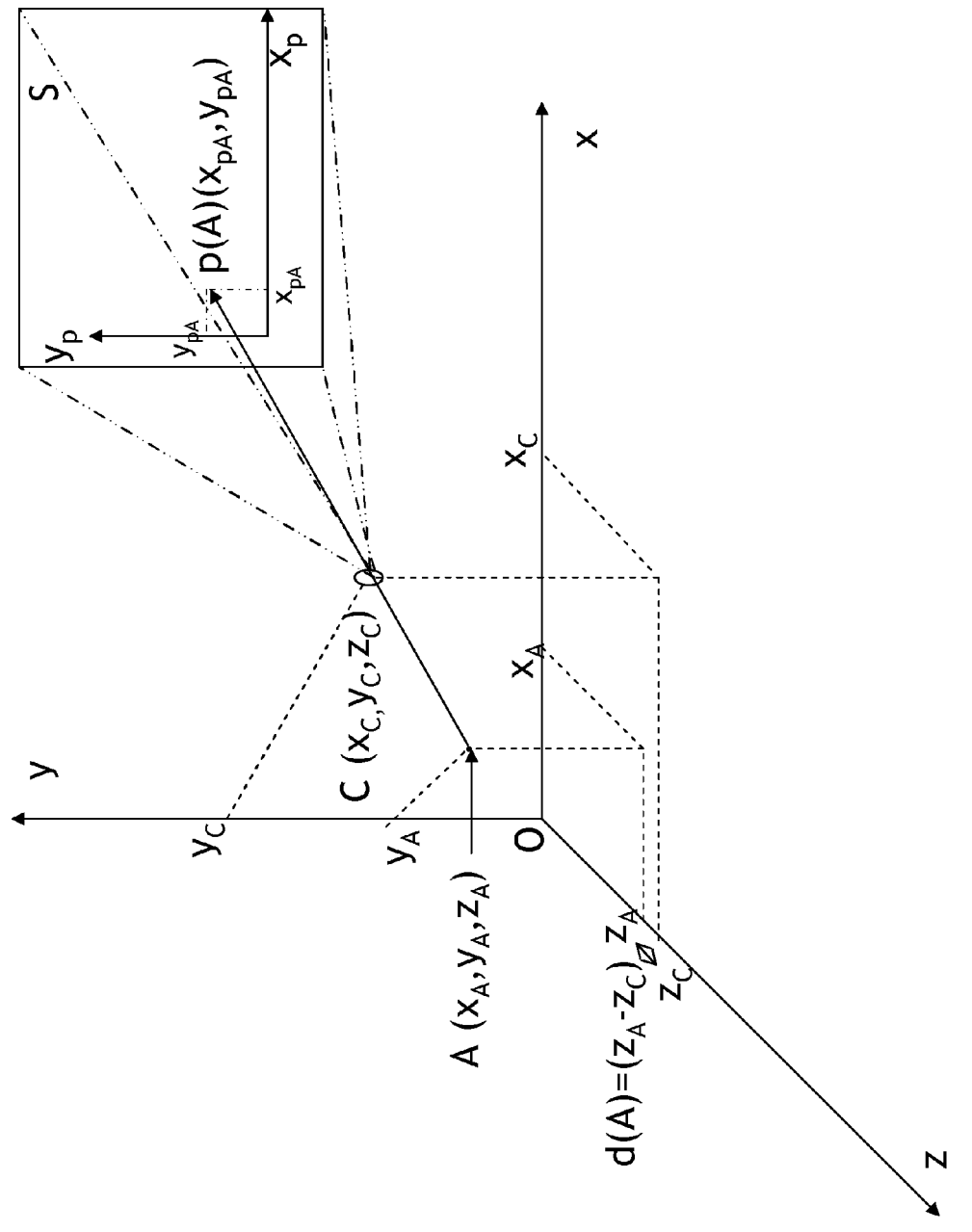
FIGS. 2a-b schematically show the geometrical model involved in embodiments of the invention

The projection itself is schematically illustrated in FIG. 2a, showing a point A with 3 space coordinates $x_A$, $y_A$ and $z_A$, with respect to an origin O defining these coordinates via three axes x,y,z defining a reference coordinate system. A pinhole camera is denoted by its camera center position C with coordinates $x_C$, $y_C$ and $z_C$ with respect to this some reference origin and reference coordinate system. A projection of point A is made on a projection screen associated to this camera, and being denoted S. the projection to this screen via pinhole C of point A, is denoted p(A) with associated coordinates ($x_{pA}$, $y_{pA}$). These coordinates are however defined with respect to two-dimensional axes $x_p$ and $y_P$ as defined within this projection plane S.

In order not to overload FIG. 2a it is assumed here that the camera is not rotated with respect to the three reference axes x,y,z. However well-known formula's exist also for this more general case, and these are used in embodiments according to this invention for the calculation of the projections and associated depth maps. These rotations of the camera are denoted $\theta_x$, $\theta_y$, $\theta_z$ for respectively denoting the rotation of the camera center around the x,y,z axis, as schematically denoted in FIG. 2b, where only these rotations are shown, for cases where the original O is coinciding with the camera center C.

In the most general case C may thus both be translated and rotated with respect to the reference origin O and the reference axes x,y,z.

Figure 2B:
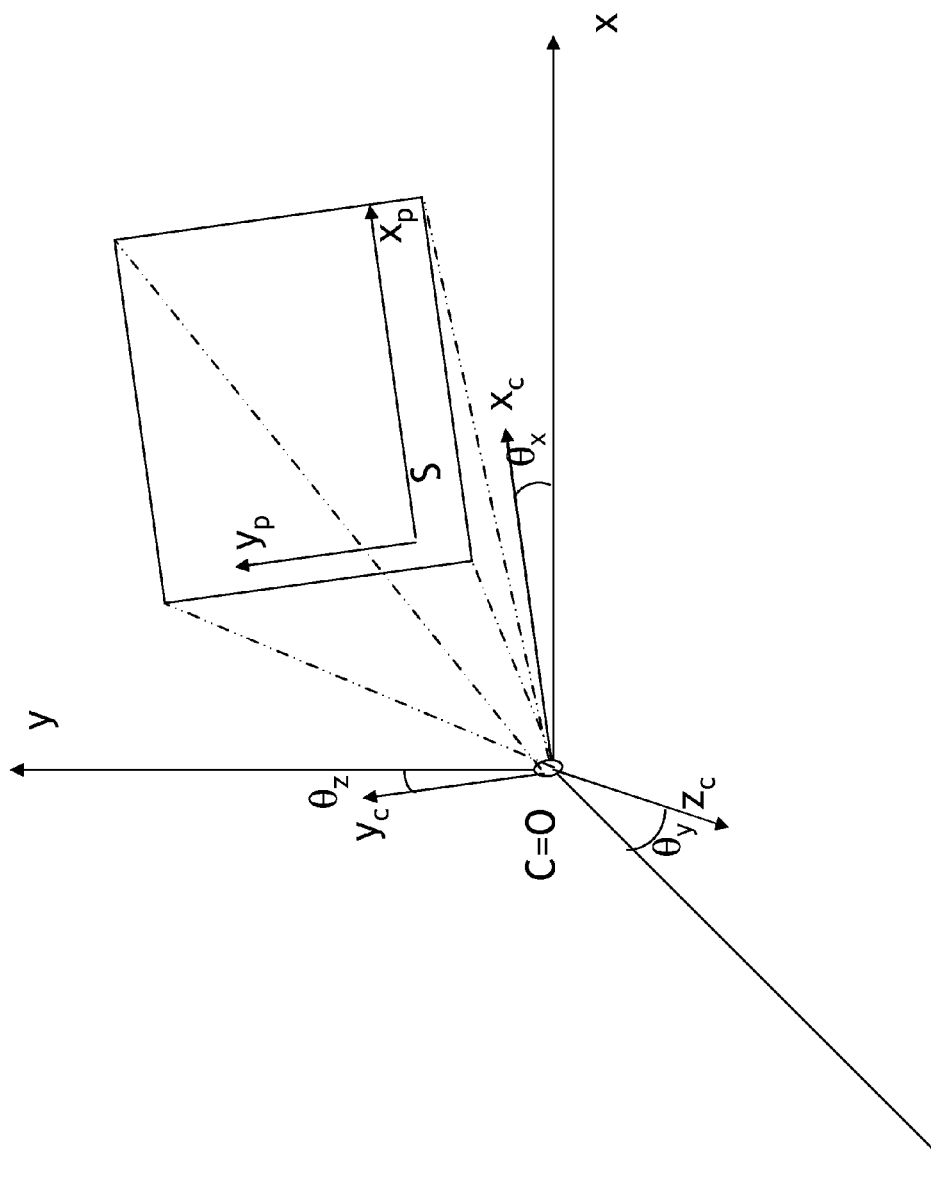

In embodiments according to the present invention the projection of a 3D model then will consist of the color or texture information of the projected 3D points of this model, as long as these are falling within the contours of the screen area S, and as long as they are not occluded by another projection of another 3D point of this model. Occlusion indeed occurs almost inherently with all 2D projections of a 3D object, and relates to the fact that more than one 3D point of this model will be projected to the same 2D point on the projection The depth map associated to this projection will then consist, for each of the projected pixels p(A), of their respective relative depth value, with respect to the position of the camera. This is denoted as $$d_z = \cos\theta_x \cdot (\cos\theta_y \cdot (a_z - c_z) + \sin\theta_y \cdot (\sin\theta_z \cdot (a_y - c_y) + \cos\theta_z \cdot (a_z - c_z))) - \sin\theta_x \cdot (\cos\theta_z \cdot (a_y - c_y) - \sin\theta_z \cdot (a_x - c_x)) \quad (1)$$

with $\theta_x$, $\theta_y$, $\theta_z$ indicating the respective rotations of the camera around the reference axes as indicated on FIG. 2b, with $a_x$, $a_y$ and $a_z$ representing the coordinates of a point a in a reference coordinate system, $c_x$, $c_y$ and $c_z$ representing the coordinates of the camera center c in this reference coordinate system, and with $d_z$ representing the associated depth of a point a with respect to the camera center c In case where there is no rotation of the camera with respect to the reference coordinate system x,y,x in the reference origin O, these rotation angles are zero, such that the equation (1) will be reduced to $$d_z = a_z - c_z \quad (2)$$

which, using the notations as in FIG. 2a, corresponds to $$d(A) = z_A - z_c \quad (3)$$

as is also indicated in FIG. 2a

In general the projection is selected such that the features of the 3D model which are to be adapted in 3D will be part of the projection, at a sufficiently high resolution or such that they optimally fill the projection image. This may be done heuristically, by trying a set of predetermined projection positions, and selecting the one giving the best results.

In another embodiment this can be further determined via an intermediate step wherein the 3D surface of the model will be approximated by means of 3D triangles. In general only the parts of the model related to the features to be adapted will then be approximated by such 3D triangles. For each of these triangles the normal related to the perpendicular direction is determined. For an ideal projection the direction of this normal should be 180 degrees with respect to the direction of the camera to this triangle. For each camera position, the summation, over all triangles, of the cosine of this angle between the normal on the respective triangle and the direction of the camera to the center of the triangle, should then be minimal. By calculating this summation over a number of possible camera positions, and selecting the position yielding the minimum value for this summation, an optimum direction can be calculated. Alternatively the minimization problem itself can be solved, such as to determine the optimum camera direction.

Of course a lot of other techniques can be used, as is well known by a person skilled in the art.

In a next step the state is extracted from this projection. With state a configuration of object features is meant, which features are themselves represented by a set of values. These values may thus describe the possibly variable properties or features of the object. This set of values can be arranged into a vector, but other representations for such a state are of course also possible. State extraction thus means that state parameters, for representing the state of an object of an image, in this case being a projection of a 3D model, are determined. This can be done via some calculations based on the 3D model information, as will be shown in the examples described in a further paragraph, or by using more general methods e.g. first involving a step of recognition/detection of the object under consideration, possibly but not necessarily by performing segmentation operations, followed by a further in depth analysis of the thus recognized/defected object.

However in most embodiments according to the invention the 3D model itself is already known such that the state extraction can be seriously reduced to calculations based on the state of the 3D model. In case this 3D state relates to coordinates of certain features, which can be facial features in the case of a 3D model of a human head the 2D projections of these 3D points may immediately lead to the state parameters of the 2D images.

In case the state of the 3D model is not yet known, the earlier described recognition step may be followed by a further analysis e.g. involving usage of the Active Appearance Model, abbreviated by AAM. This allows, e.g. in case of a human head as object model to be updated, the determination of the shape and appearance of facial features on the 2D projected image via a fit with a 2D AAM internal shaping model. It may start with comparing the 2D projection with the starting value of a 2D AAM model, which AAM model itself is then further gradually altered to find the best fit. Once a good match is found, the parameters such as face_expression_1_x, face_expression_1_y, etc. thus determined based on this AAM adapted model are output.

In FIG. 1a the state of the projection image is denoted s1, and this is used during a target state synthesis step. The target state s is obtained from the state s1 of the 2D projection, and from external state information. This external state information, denoted se, may have been determined beforehand, either offline e.g. from a still image input, or based on other descriptive information, e.g. high level semantic information with respect to e.g. the shape of a nose or colors of the eyes, facial expressions etc. In this case this external state information may also be stored beforehand within a memory.

Alternatively this external state information se can be determined "on the fly" e.g. based on changing external video image input data, which can thus rapidly change over time. In such situations the external state se will generally be determined on successive frames of a video sequence.

The external state information is used together with the state s1 of the 2D projection for obtaining the target state.

Methods for determining the target state, denoted by s in FIG. 1a, out of the input state s1 and se, may comprise performing a weighted combination of the value of s1 and se, with the weights reflecting the confidence of the states, which confidence levels themselves were determined during the state extraction itself. For the aforementioned example of the AAM method for determining the s1 parameters, parameters identifying the matching result can then e.g. be selected as such confidence measures.

Another method for determining the target state may simply consist of selecting e.g. se, which option can be preferred in case a check of the result of the interpolation or weighted combination as explained in the previous example, of the different states, indicates that such interpolated result is lying outside predetermined limits.

Figure 4A:
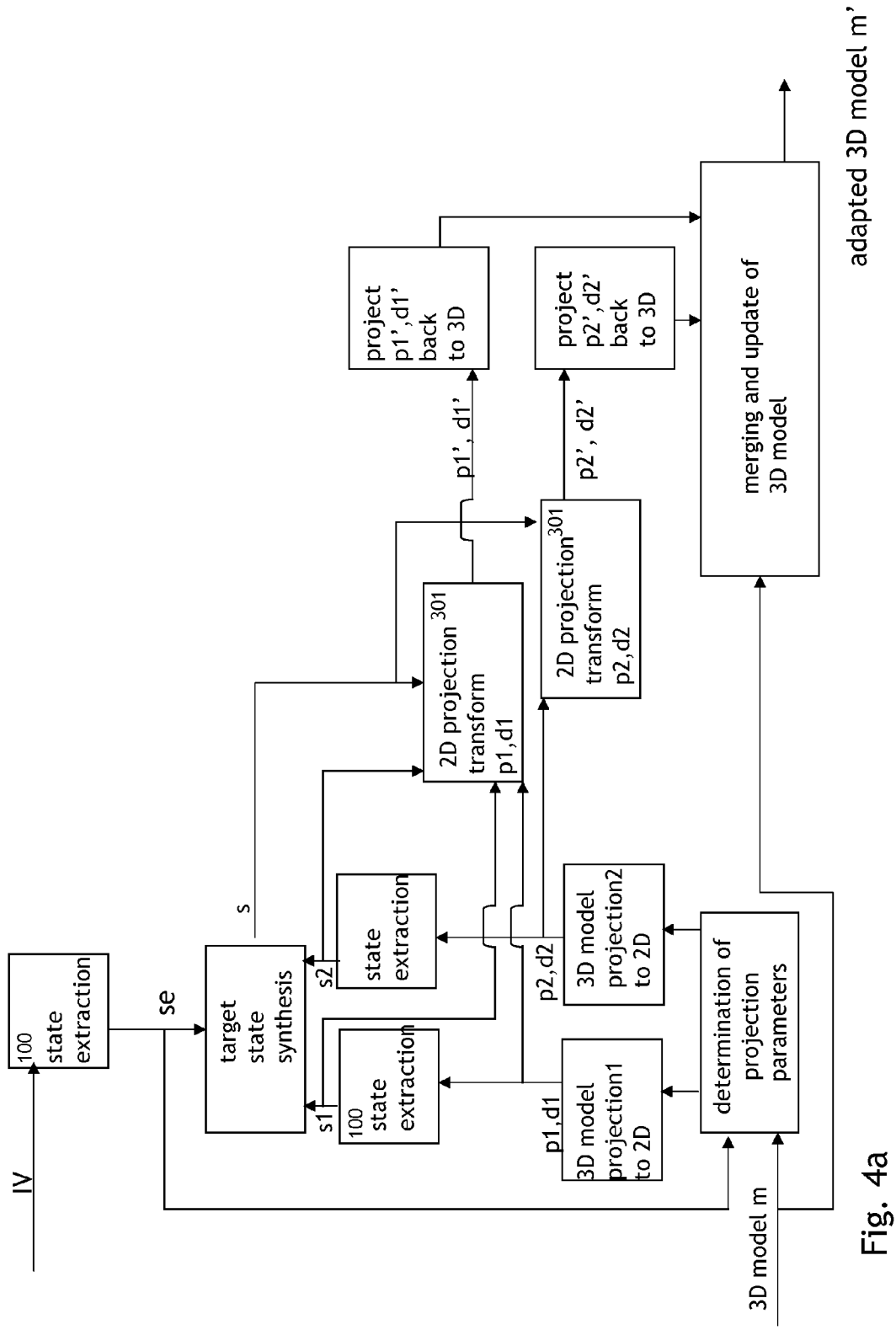
FIGS. 4a-b show a third, resp. fourth embodiment of the method, FIGS. 5a-c clarify the different steps as performed by the embodiment of FIG. 3a in case of an additional 2D video input.
Figure 4B:
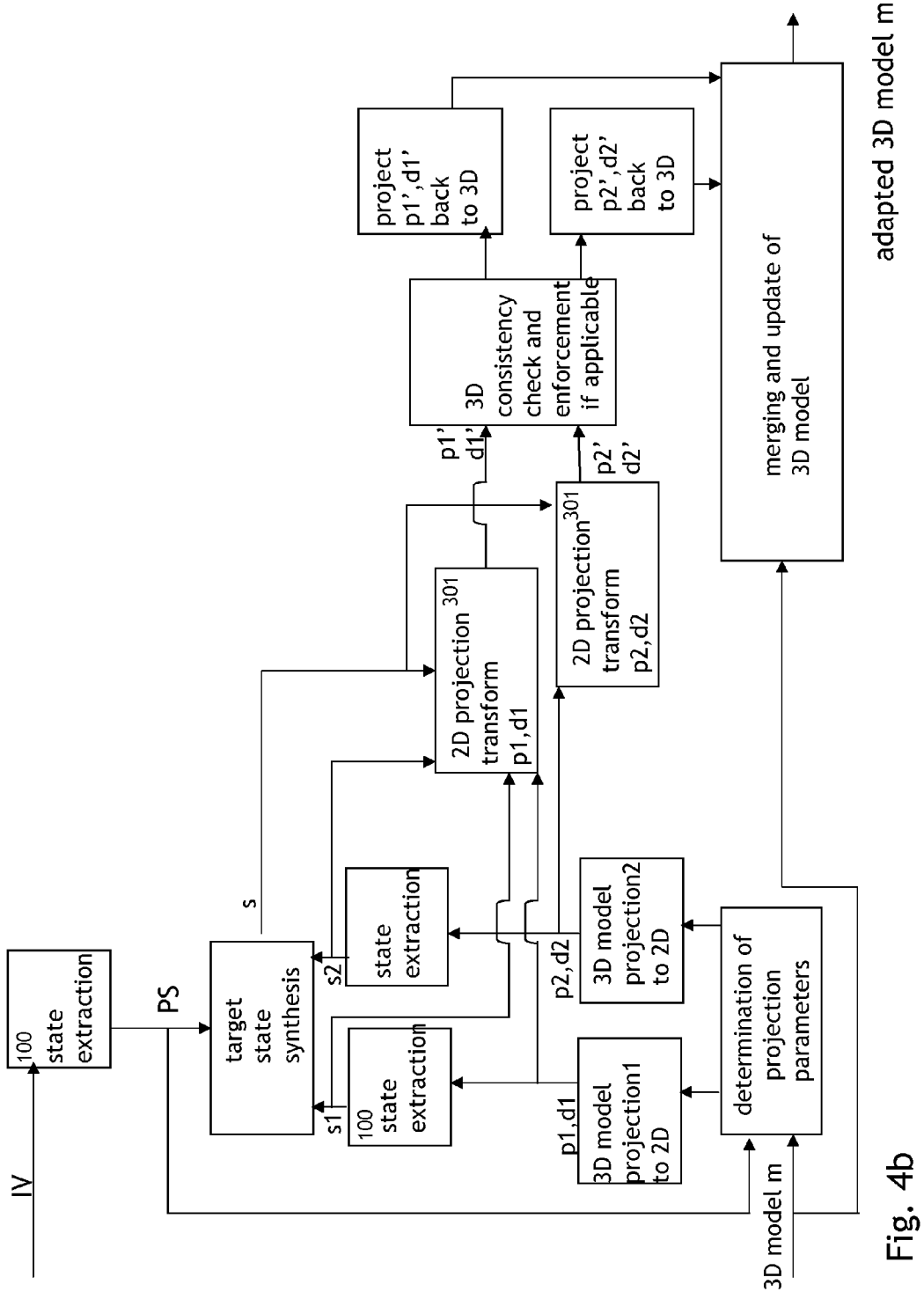

Specific implementations for the determination of the state and target states will be further described during the description of the embodiments of FIGS. 4a-b.

Upon determination of the target state, denoted s in FIG. 1a, the 2D projection p1 as well as the associated depth map d1 will be transformed in accordance with the target state s. In an example a method making use of triangles for representing e.g. facial features may be used. By means of interpolating distances as defined by these triangles, and attributing features to the pixels as these new positions, which were previously attributed to the pixels at their previous position, an image transform may result. Such method is very useful in case a lot of such triangles are used.

In a similar method the updated 2D coordinates of the pixels of the projection images, associated to the features, will be calculated in accordance with the new state. The color and texture information of pixels lying in between triangles defined on the original 2D projection, will be attributed to the pixels lying in between the triangles at these new positions in the updated images. If thus two points on the 2D projection have internal coordinates (100,100) and (200,200), and these will be transformed to coordinates (50,50) and (100,100) on the transformed projections, the color of original pixel at coordinate (150,150) will be attributed to the pixel in the transformed image at coordinate (75,75).

Another more detailed implementation will be further described when describing FIGS. 4a-b.

The adapted 2D projection is denoted p1'.

In parallel also the associated depth values of the associated depth map are adapted in accordance to the target state. In some embodiments the target state determination directly involves the calculations of adapted depth values, for some of the pixels of the projection. Adaptation of the other depth values in accordance with the target state may then also take place via an interpolation between the already calculated adapted depth, as was explained in the previous paragraph with respect to the adaptation of the color values for the adapted projected pixels.

The adapted depth map is denoted d1'.

Based on the transformed depth map and transformed 2D projection, which generally includes the adapted 2D image model, a re-projection or back-projection to 3D can be performed, using the reverse transformations as these used during the 3D to 2D projections themselves, but now using the adapted associated depth values for each 2D pixel of the adapted projection image.

The result of this back-projection is denoted p3d_1.

In some cases the back-projected points in 3D are sufficient for forming an updated 3D model.

In other embodiments the back-projection to 3D is merged with the original 3D model m, to obtain the updated or adapted 3D model m'.

Figure 1B:
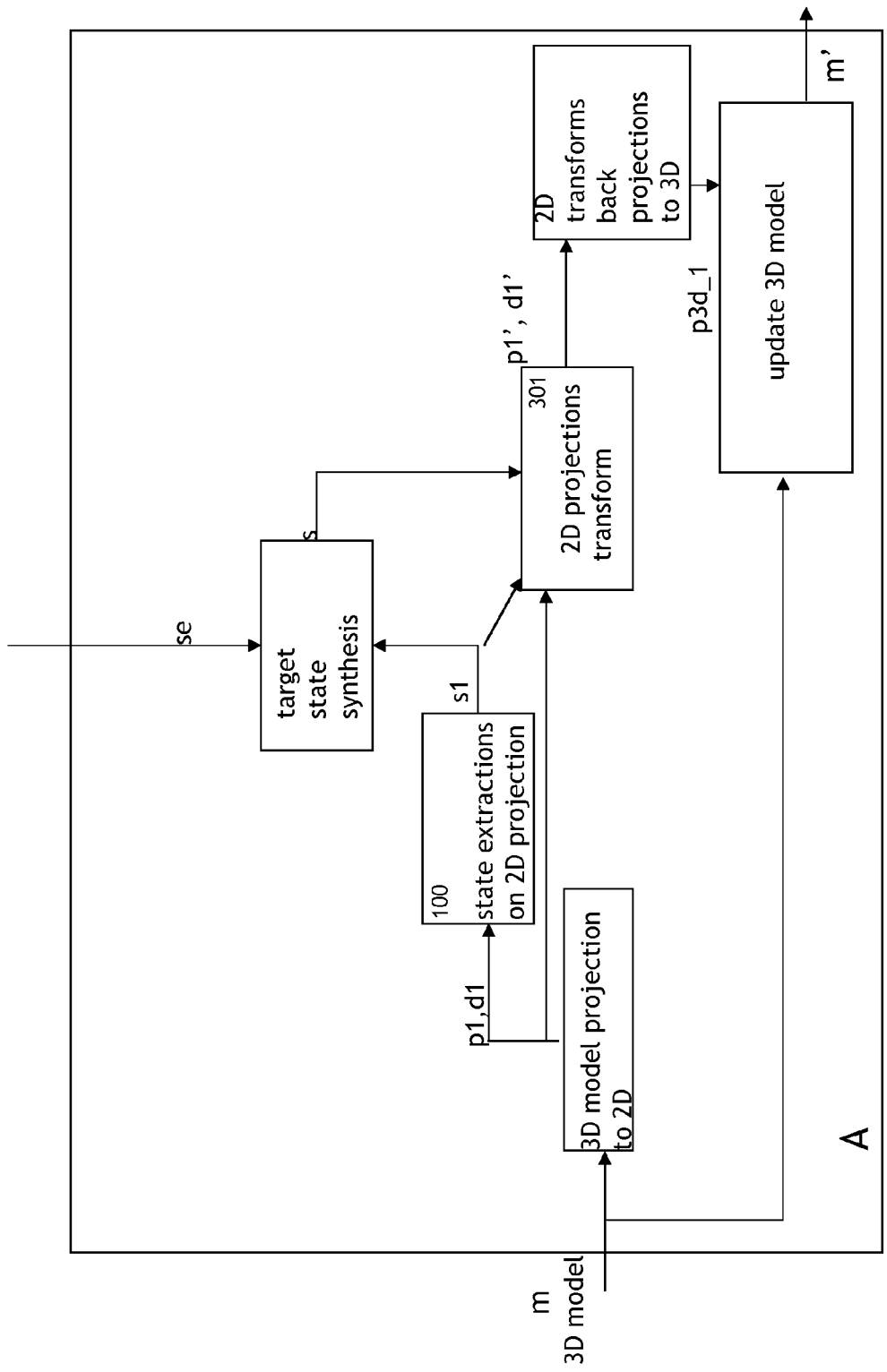

FIG. 1b shows an arrangement A for performing an embodiment of the method.

Figure 3A:
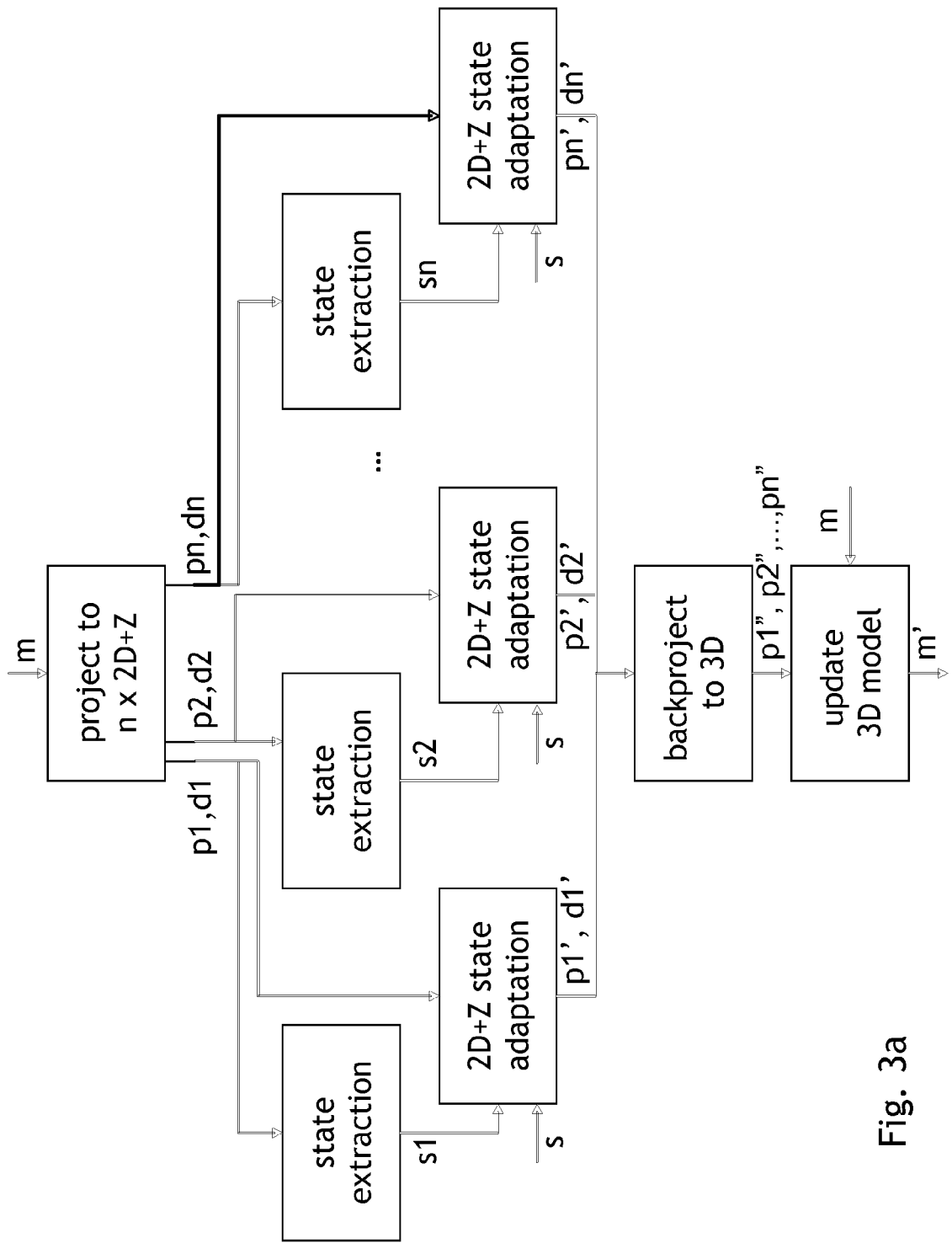
FIGS. 3a-b show a second variant of the method.

FIG. 3a shows a variant embodiment wherein more than 1 projection is performed from the initial 3D model m. The projections themselves may be selected in accordance with the form and shape of the model, and the amount of occlusions which occur by selection of a first projection, or using one of the methods as previously described for the determination of the projection parameters itself. A possible implementation can thus be based on approximations of the 3D surface which is to be modeled by means of a set of triangles in 3D. For each of these triangles the perpendicular direction is calculated. This may be represented by a 3D "normal" vector pointing outside the 3D model body. By calculating the difference between this 3D vector and the camera projection direction, a simple way for determination of occlusion is obtained, as for non-occluded surfaces, the projection direction should be opposite to the normal vector. As such the camera projection can be tuned, and it may thus also turn out that, for obtaining a sufficiently good projection, thus with sufficient resolution, of all features to be modeled, that several projections may be needed. Alternatively, a default number of 3 predetermined projections may also be used, alleviating a trial and error calculation of the most optimum camera position.

These different projections are denoted p1,p2 to pn, with associated depth maps d1,d2 to dn. Each of these projections is thus associated with a virtual camera with a certain position, rotation, and associated screen width and length, as denoted in FIGS. 2a-b.

Each of these different projections p1 to pn will also undergo state extraction or operations, leading to respective determined states s1,s2 to sn. In some embodiments the states of these respective projections can be calculated, as earlier described, especially in these situations where the features to be adapted directly relate to the coordinates or pixel positions of the features under consideration.

These respective determined states s1 to sn are used as respective input, possibly but not necessarily together with external slate input se, for determination of a target state s. This determination of the target state may comprise performing a weighted combination of the various input states, with the weights reflecting the confidence of the states, which confidence levels themselves were determined during the state extraction itself. For the earlier example of the AAM method for determining the s1 parameters, parameters identifying the matching result can then e.g. be selected as such confidence measures.

Another method for determining the target state may simply consist of selecting one of the input states, or of the external state which option can be preferred in case a check of the result of the interpolation or weighted combination as explained in the previous example, of the different states, indicates that such interpolated result is lying outside predetermined limits.

The target state s forms the basis of which the n respective projections and their respective associated depth maps are updated. The updated projections are denoted p1', p2' to pn', and the updated depth maps are denoted d1', d2' to dn'.

Each of these updated projections p1', p2' to pn' is then back-projected to 3D based on the updated depth map values associated to each 2D pixel in the projections. These back-projections are merged together with the original model to create an updated or adapted model.

Figure 3B:
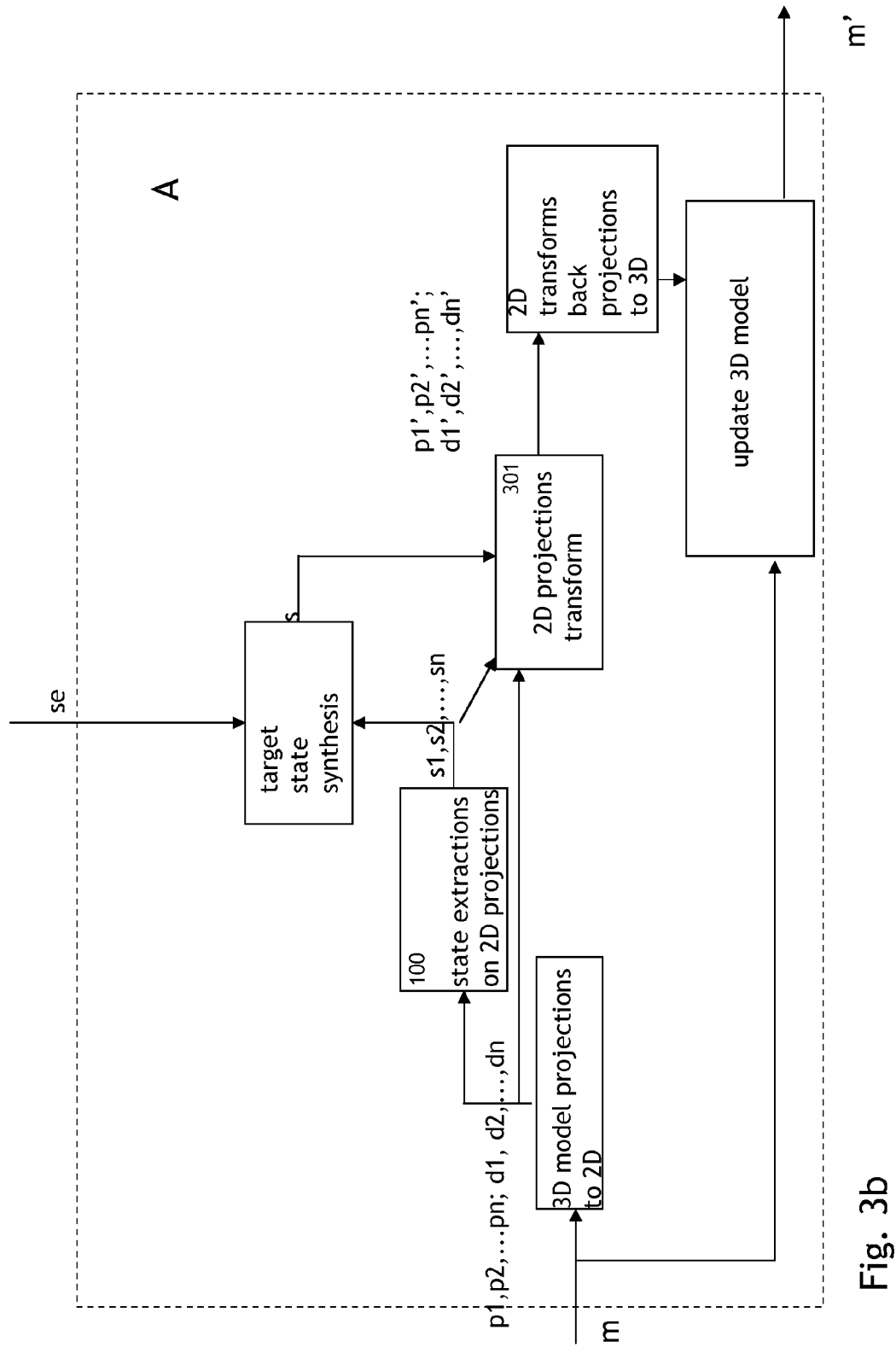

FIG. 3b shows an embodiment of an arrangement for performing this variant method.

FIG. 4a describes an embodiment for adapting a 3D model of a head of a person. In this embodiment the state of this model relates to the expressions of the face, but in other embodiments the state may as well relate to colours of the hair, eyes, skin etc. The goal in this particular embodiment is to animate the 3D model using facial features provided by an input 2D video.

This input video is denoted IV on FIG. 3a. For each frame of the video the scale and orientation of the object are estimated with respect to these of the 3D model. This is preferred for determining a first projection, being related to the virtual camera viewpoint of the 3D model to a 2D plane, which projection should resemble as much as possible the 2D projection used in the camera capturing the 2D video. This particular choice of first projection is not needed as such, but may be beneficial for an easy update. For this particular projection, the projection of the 3D model to a 2D plane should thus use a virtual camera with associated projection parameters which resemble as close as possible those of the camera used for having taken the 2D images of the input video.

This calculation of these projection parameters is done in accordance with known techniques such as will be described here below:

Input to the process of determining the parameters for this virtual camera is a 3D database model of a human face and a live 2D video feed. As the 3D positions of the facial features of the 3D database model, the 2D positions of the facial features in the live video feed and the projection matrix of both the webcam and the virtual camera are known, these data should be sufficient to calculate the 3D position of the facial features of the face in the live video feed. If the 3D positions of the facial features in the live video feed are thus known, together with the 3D location of the corresponding facial features of the database model, the 3D transformation (translation and rotation) between the corresponding 3D positions can be calculated. Alternatively the 3D transformation (translation and rotation) needed on a virtual camera in order to capture the same 2D viewport of the 3D database model, as is seen in the live video feed can thus also be calculated. The minimal amount of feature points needed, for this calculation of transformation to be applied on the virtual camera, is 3. Because the human face isn't a rigid object due to the changing and different emotions, taking more facial features would require solving minimization problems. Therefore 3 stable points, e.g. the left edge of the left eye, the right edge of the right eye and the top of the mouth, are used. The 3D position of these 3 facial features in the database model, together with the 2D position of the corresponding facial features in the live video feed and the webcam projection matrix are next inputted to the well known Grunert's algorithm. This algorithm will provide the calculated 3D positions of these corresponding 3 facial features. This can in turn be used to move the virtual camera around the 3D database model in order to capture the same 2D view of the database model as is provided by the face in live video feed.

In some embodiments, as the one shown in FIG. 4a, it may be preferred to use yet another projection of the 3D model. This may be desirable in case the first projection using camera parameters resulting in an optimum projection resemblance with the image of the video feed, still does not result in sufficient pixel data, e.g. when at the projection image a portion of the face is occluded by the nose.

Figure 5A:
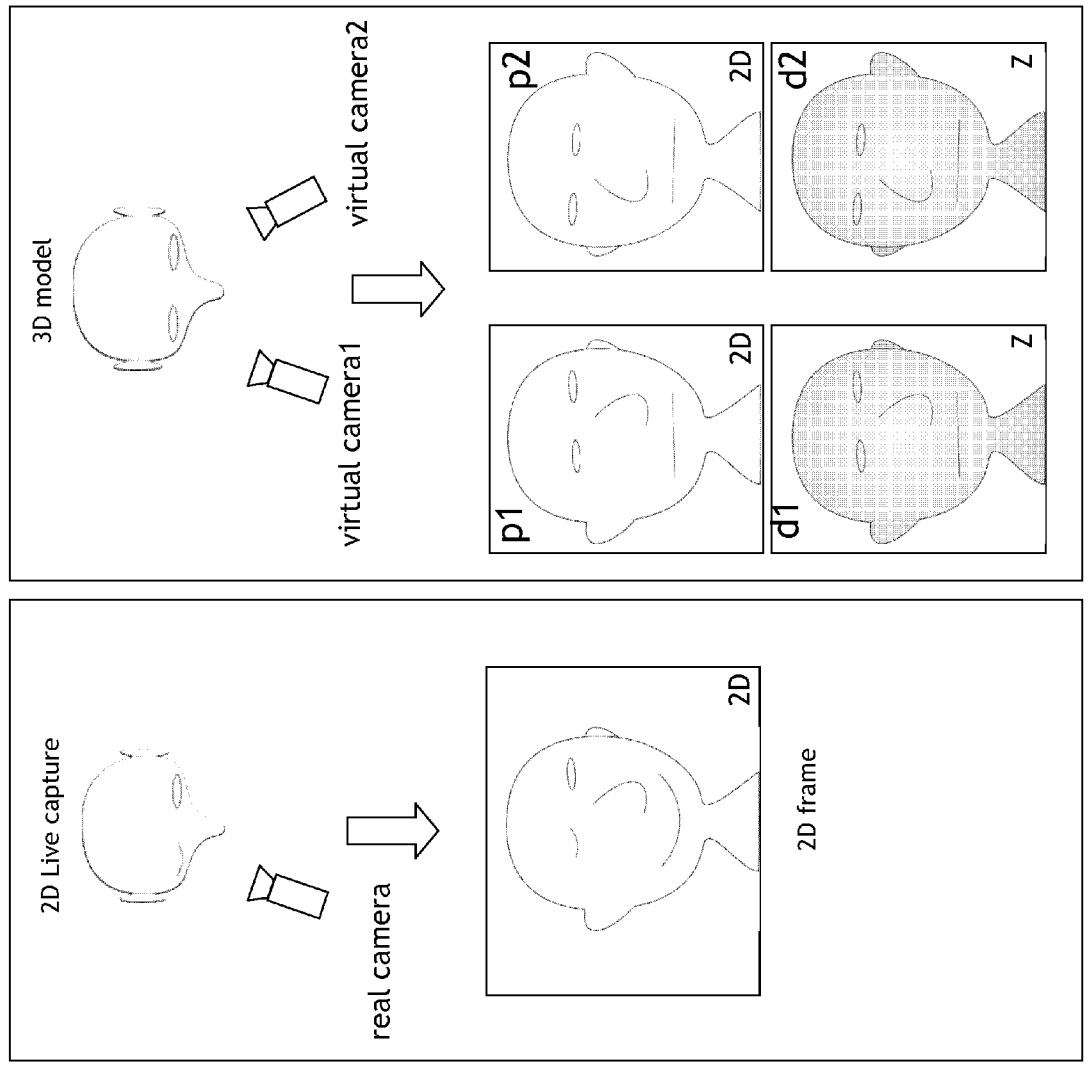

This is illustrated on FIG. 5a, depicting in the left rectangle the video captured by a "real" camera of the "real" person, while the left part of the right rectangle shows the projection of the 3D model with the first virtual camera, denoted virtual camera 1. As can be observed, the projection of the 3D model by this virtual camera matches the projection conditions used by the "live" 2D camera. Yet still some pixels of the left part of the face are occluded by the nose. Therefore another projection, by another virtual camera is performed, this camera being denoted "virtual camera 2". Its parameters are determined based on the occluded pixels of the other camera position. This can e.g. be determined based on the intrinsic parameters such as focal point and the extrinsic parameters of the virtual cameras and on the knowledge of the 3D model. This information will enable to determine whether or not two voxels or 3D points of the features to be modeled of 3D model will be projected to the same pixel in a 2D projection. If this is the case, it is clear that occlusion will occur. Based on this information, another virtual camera position can then be calculated, allowing different projections at least for this voxel. By performing this check on all projected pixels, the presence of occlusion can be determined, and another virtual camera position and rotation can be determined based on this.

In another embodiment a number of predetermined virtual cameras can be used, or a selection out of these, for getting projections of the features of interest. Alternatively also a standard configuration of virtual cameras for providing respectively a front view, and two side views at 90 degrees may be used, and dependent on which features are to be modeled, all projections, or a subset of them can be used.

In case only two projections are used, the result of this second projection is shown in the right part of the right rectangle of FIG. 5a. Together with the projections p1 and p2, also associated depth maps are created, denoted d1 and d2. These indicate, for each 2D projected pixel, the relative depth, including rotational information by virtue of equation (1) with respect to the respective camera positions, as observed from the point of view of the respective virtual camera 1 or 2. The depth map for each of the two projections is denoted in the bottom figures of the right rectangle.

Figure 5B:
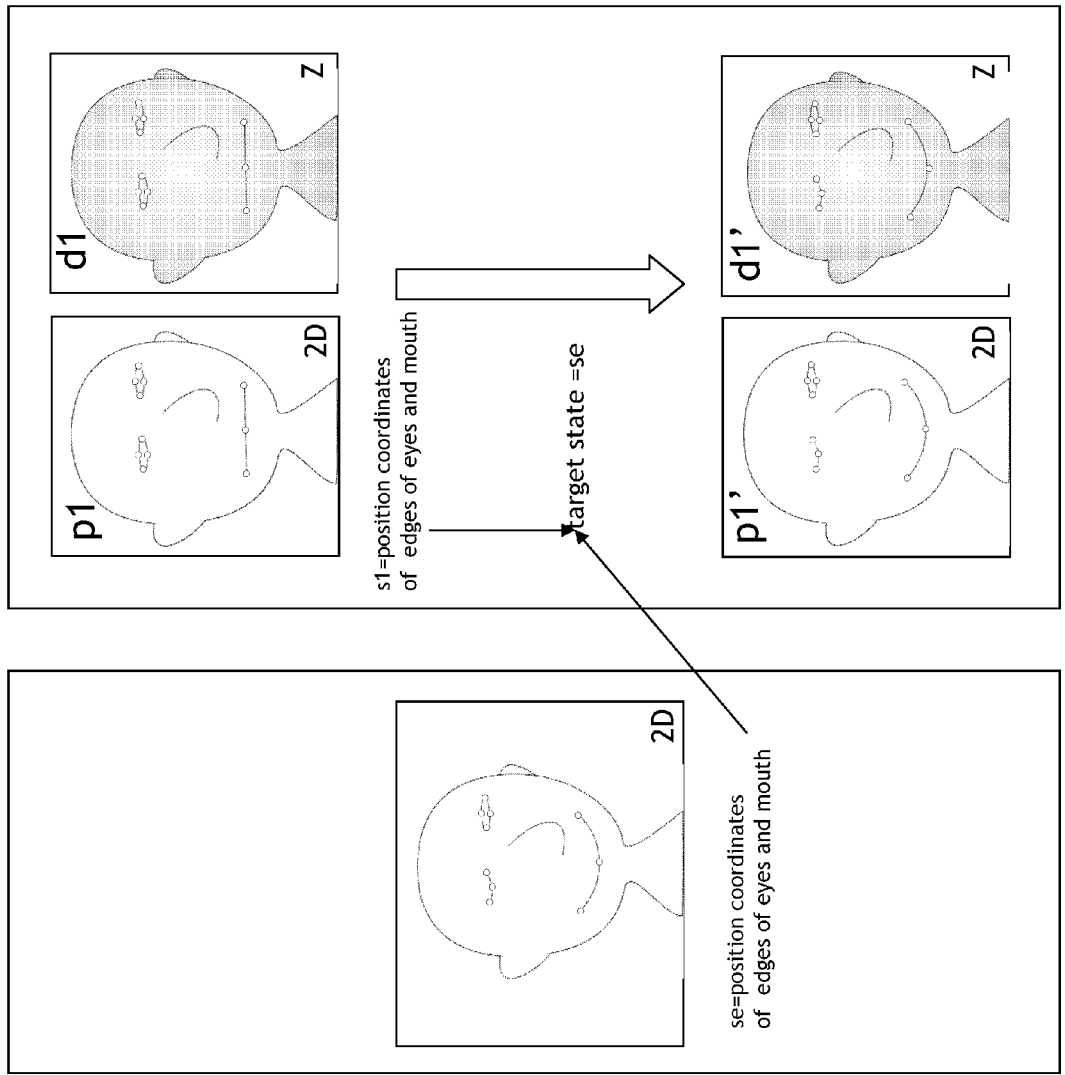
Figure 5C:
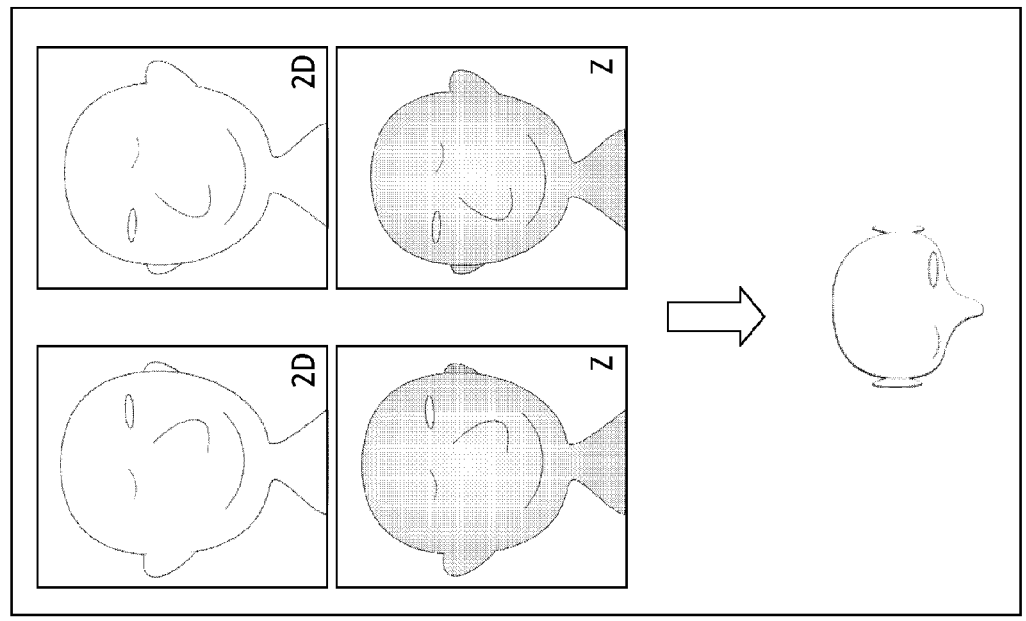

In a next step the state is to be extracted on both projections p1 and p2 as well as on the successive frames of the input video. As in this embodiment the state relates to the facial expressions, these are thus to be characterized. Features relating to these facial expressions are extracted both on the successive frames on the input video as on the 2D projections using state of the art techniques such as the aforementioned AAM technique. It is also possible to calculate the states of the projections as earlier explained based on the 3D state of the model and on the corresponding voxel projections. This is shown in FIG. 5b, in the left rectangle indicating positions of different pixels of edges of the mouth and eyes on the live 2D frame. These positions of these same features are thus also determined on the projections. In the right part of FIG. 5b, this is only shown for projection p1, but it is clear that this also takes place on projection p2, which is not shown on this figure in order not to overload the drawing. In this particular embodiment the respective states correspond to the positions of the pixels associated to these features as present on p1, p2 and on an input frame. These states are respectively denoted s1, s2 and se. As only p1 is shown on FIG. 5b, also only s1 is shown. These 3 states are used for determining the target state, which in this embodiment corresponds to the state se. While in this embodiment the respective states s1 and s2 are thus not used for the determination of the target state, these respective states s1 and s2 are nevertheless used during the transformation of the projections in accordance with the target state. This target state is thus also used for adapting the 2D projections p1 and p2. For the virtual camera, corresponding to the "real" video camera, this adaptation can be easily done by replacing the pixel locations of the selected features by the corresponding pixel locations of these features as present in the video frame. By virtue of the selection of virtual camera 1 as mapping to the real camera, this can be done very easily. For adapting the 2D projection p2 obtained by the other virtual camera 2, a possible method involves calculating the locations of the adapted features of p2 first determined in 3D. This can be done based on the adapted projection p1' and adapted depth map d1'. This allows to determine, for these features which were visible on p1', to calculate their position in 3D. By using the projection parameters for the second projection, their corresponding positions on p2' can be identified. For the occluded features from p1 and p1', interpolation techniques may be used for calculating the adapted projections and adapted depth map.

Once the new locations of the key features for p1 and p2 are known, morphing techniques such as weighted interpolation can be used for determining the color and depth of the pixels that were no key features.

The adaptations of the projection p1 is shown in the bottom figures of the right rectangle on FIG. 5b. It is clear that this projection is now adapted to the "laughing" face expression, as present on the input video frame of the left hand rectangle. This will also occur on projection p2 (not shown on FIG. 5b)

Both adapted projections p1' and p2' are then re-projected to 3D using the adapted depth maps and merged, to replace or update the old data. The data for d1' may be calculated based on the approximation that the adapted depth equals the initial depth, thus that the initial depth d(A) for pixel A, related to a feature under consideration and with projection coordinate $x_{pA}$, $y_{pA}$ will now be attributed to the pixel with coordinate $x_{pA}'$, $y_{pA}'$ for $x_{pA}'$ and $y_{pA}'$ being the adapted coordinates of the feature under consideration.

In this respect it is to mention that all back-projections of the adapted 2D images should be consistent in the 3D domain. This basically means that when back-projecting a transformed feature that is visible in more than one 2D projected image, that this feature should be back-projected to the same 3D location from all projections. So if the corner of the mouth is transformed, and this corner of the mouth is present in several of these projections, all back-projected coordinates should be the same.

Say x_3d is a certain feature on the 3D object that is considered (e.g. the tip of the nose), x_3d is a vector with information (x, y, z, color), x_2dz is a certain feature in the 2D+Z domain, it is a vector containing information (x_2d, y_2d, depth, color).

The projection of 3D to 2D+Z according to a certain virtual camera c1 is modelled with the function p:

$$p(c1,x\_3d)=x\_2dz\_c1$$

Lets now consider the state adapted 3D model. The expected 3D feature after state adaptation is called x'_3d. The 3D state transfer function is m_3d:

$$x'\_3d=m\_3d(x\_3d)$$

this means that $$x'\_2dz\_c1=p(c1,x'\_3d)=p(c1,m\_3d(x\_3d))$$

As the adaptation with respect to the state is performed on the projections, thus in the 2D+Z domain, the m_3d function is not available. This can be approximated by using a m_2dz function:

$$x''\_2dz\_c1=m\_2dz(c1,x\_2dz\_c1)$$

which can only be 3D state consistent if $$x'\_2dz\_c1=x''\_2dz\_c1$$

this means that the functions p(c1,m_3d) and m_2dz(c1) are effectively the same within the considered domains.

If this is the case, there is no issue and the aforementioned method can be used without any problems. If not, an additional step has to be implemented.

To take this into account a careful selection of the projection parameters could solve this issue from the beginning.

However, is this is not taken care of, such an inconsistency might be the case. One of the issues is that when using multiple 2D+Z sources to re-build the 3D model, that the back-projections of these sources need to "agree" on the state transfer function. When the functions are 3D state consistent, this is no problem (as all 2dz functions actually implement specific 2dz version of the 3d state transfer function). When they are not 3d state consistent, we need to force their consistency, either via the "correct" 3d state transfer function, or an approximation thereof. This can be done for instance by choosing one reference 2DZ state transfer function, and projecting all other state transfer functions onto this reference:

$$x'\_2dz\_c1ref=m\_2dz(c1ref,x\_2dz\_c1ref)$$

Now we consider m_2dz(c1ref) to be our reference 2dz state transfer function. We can build the other functions by moving via the 3D domain:

$$x'\_3d=p\_inv(c1ref,x'\_2dz\_c1ref)=p\_inv(c1ref,m\_2dz(c1ref,x\_2dz\_c1ref))$$

$m\_2dz(c2,x'\_2dz\_c2)=p(c2,x'\_3d)=p(c2,p\_\text{inv}(c1\text{ref},m\_2dz(c1\text{ref},x\_2dz\_c1\text{ref})))$ Note that not all features from the object in 3D will have valid values after moving through p(c, x_3d). For instance points that are not within the virtual camera view, or points that are occluded by other features in the object. In order to have a consistent transfer function for such points, other reference cameras will be needed.

A second embodiment is a variant to the first that also involves the state adaptation of a 3D model of the face of a person; but as opposed to the previous embodiment it used a 2D+Z camera instead of a 2D camera e.g. using a stereo camera or a time-of-flight camera such as the Microsoft Kinect. in this case we can use the facial feature points in 3D coordinates instead of 2D as external. We again take as many 2D+Z projections of the offline model as needed to cover all points that are modified by the live data and infer the state onto these projections. One can for example merge the data by using the morphing technique of the previous embodiment on the 'offline' 2D+Z data, but now also use the modified Z data for the feature points In these embodiments we were able to reduce the problem of 3D state adaptation. Where we started from transferring state from one or multiple 2D images to a full 3D model, it is now reduced to transferring state from 2D to 2D+Z making these operations tractable for real-time applications.

While the principles of the invention have been described above in connection with specific apparatus, it is to be clearly understood that this description is made only by way of example and not as a limitation on the scope of the invention, as defined in the appended claims. In the claims hereof any element expressed as a means for performing a specified function is intended to encompass any way of performing that function. This may include, for example, a combination of electrical or mechanical elements which performs that function or software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for, and unless otherwise specifically so defined, any physical structure is of little or no importance to the novelty of the claimed invention. Applicant thus regards any means which can provide those functionalities as equivalent as those shown herein.

The invention claimed is:

1. A method for adapting a 3D model of an object, comprising the steps of:
   performing, via a processor, at least one projection of the 3D model to obtain at least one 2D image model projection with associated depth information;
   performing, via the processor, at least one state extraction operation on the at least one 2D image model projection to obtain at least one state comprising a configuration of object features, the features being represented by a set of values;
   either receiving, via the processor, external state information being offline determined state information based on 2D still image data or on descriptive information,
   or receiving, via the processor, an external 2D image input, from which the external state information is extracted;
   determining, via the processor, a target state from the at least one state and from the external state information by performing a weighted combination of the at least one state and the external state information with the weights reflecting confidences of the states determined during the state extraction;
   adapting, via the processor, the at least one 2D image model projection and the associated depth information using the at least one state and the target state to obtain at least one adapted 2D image model and an associated adapted depth; and
   back-projecting, via the processor, the at least one adapted 2D image model to 3D based on the associated adapted depth to obtain an adapted 3D model.

2. The method of claim 1, wherein the adapted 3D model is further determined based on 3D model information.

3. The method of claim 2, wherein the external state information comprises high level semantic information with respect to the object features.

4. The method of claim 1, wherein the step of adapting comprises determining, via the processor, a new location for at least one object feature of the at least one state based on a corresponding object feature of the state of the external image input.

5. The method of claim 1, wherein at least one of the 2D projections of the 3D model is performed based on a virtual camera deduced from the external image input.

6. An apparatus comprising one or more processors configured to:
   perform at least one projection of the 3D model to obtain at least one 2D image model projection with associated depth information;
   perform at least one state extraction operation on the at least one 2D image model projection to obtain at least one state comprising a configuration of object features, the features being represented by a set of values;
   either receive external state information being offline determined state information based on 2D still image data or on descriptive information,
   or receive an external 2D image input, from which the external state information is extracted;
   determine a target state from the at least one state and from the external state information by performing a weighted combination of the at least one state and the external state information with the weights reflecting confidences of the states determined during the state extraction;
   adapt the at least one 2D image model projection and the associated depth information using the at least one state and the target state to obtain at least one adapted 2D image model and an associated adapted depth; and
   back-project the at least one adapted 2D image model to 3D based on the associated adapted depth to obtain an adapted 3D model.

7. The apparatus of claim 6, wherein the adapted 3D model is further determined based on 3D model information.

8. The apparatus of claim 6, wherein the external state information comprises high level semantic information with respect to the object features.

9. The apparatus of claim 6, wherein the adapt the at least one 2D image model projection further comprises one or more processors configured to determine a new location for at least one object feature of the at least one state based on a corresponding object feature of the state of the external image input.

10. A non-transitory computer readable medium encoding a machine-executable program of instructions to perform a method, the method comprising the steps of:

performing at least one projection of the 3D model to obtain at least one 2D image model projection with associated depth information;

performing at least one state extraction operation on the at least one 2D image model projection to obtain at least one state comprising a configuration of object features, the features being represented by a set of values;

either receiving external state information being offline determined state information based on 2D still image data or on descriptive information, or receiving an external 2D image input, from which the external state information is extracted;

determining a target state from the at least one state and from the external state information by performing a weighted combination of the at least one state and the external state information with the weights reflecting confidences of the states determined during the state extraction;

adapting the at least one 2D image model projection and the associated depth information using the at least one state and the target state to obtain at least one adapted 2D image model and an associated adapted depth; and back-projecting the at least one adapted 2D image model to 3D based on the associated adapted depth to obtain an adapted 3D model.

11. The non-transitory computer readable medium of claim 10, wherein the step of adapting comprises determining a new location for at least one object feature of the at least one state based on a corresponding object feature of the state of the external image input.

12. The method of claim 1 wherein the adapting the at least one 2D image model projection and the associated depth information using the at least one state and the target state is performed on features extracted from external live video and projected 2D images, and wherein new positions of the features for the projected 2D images are determined based on locations of the features of the live video.

13. An image processing apparatus comprising an apparatus as set out in claim 6.

14. An apparatus for adapting a 3D model of an object, comprising one or more processors adapted to:

perform at least one projection of the 3D model to obtain at least one 2D image model projection with associated depth information;

perform at least one state extraction operation on the at least one 2D image model projection to obtain at least one state comprising a configuration of object features, the features being represented by a set of values;

either adapted to receive external state information being offline determined state information based on 2D still image data or on descriptive information, or adapted to receive an external 2D image input, from which the external state information is extracted;

determine a target state from the at least one state and from the external state information by performing a weighted combination of the at least one state and the external state information with the weights reflecting confidences of the states determined during the state extraction;

adapt the at least one 2D image model projection and the associated depth information using the at least one state and the target state to obtain at least one adapted 2D image model and an associated adapted depth, wherein the adapt the at least one 2D image model projection and the associated depth information using the at least one state and the target state is performed on features extracted from external live video and projected 2D images; and back-project the at least one adapted 2D image model to 3D based on the associated adapted depth to obtain an adapted 3D model.

\* \* \* \* \*